United States Patent [19]

Fondacci

[11] 4,245,468
[45] Jan. 20, 1981

[54] CONTROL DEVICE FOR A GAS TURBINE

[75] Inventor: Jean-Luc Fondacci, Montgeron, France

[73] Assignee: Societe Nationale d'Etude et de Construction de Moyeurs d'Aviation, Paris, France

[21] Appl. No.: 950,045

[22] Filed: Oct. 10, 1978

[30] Foreign Application Priority Data

Oct. 11, 1977 [FR] France .................. 77 30486

[51] Int. Cl.³ .............................................. F02C 9/04
[52] U.S. Cl. ........................................... 60/39.28 R
[58] Field of Search ............................... 60/39.28 R

[56] References Cited

U.S. PATENT DOCUMENTS

| | | | |
|---|---|---|---|
| 3,131,750 | 5/1964 | Turner | 60/39.28 R |
| 3,390,522 | 7/1968 | Whitehead | 60/39.28 R |
| 3,514,948 | 6/1970 | Warne | 60/39.28 R |
| 3,713,290 | 1/1973 | Gold | 60/39.28 R |
| 3,726,086 | 4/1973 | Herbstritt | 60/39.28 R |

FOREIGN PATENT DOCUMENTS 2086031  4/1971  France .

*Primary Examiner*—Robert E. Garrett
*Attorney, Agent, or Firm*—Bacon & Thomas

[57] ABSTRACT

A volumetric pump, rotating at a velocity proportional to that of the turbine engine, supplies fuel to a combustion chamber through two throttles mounted in cascade, the downstream throttle having a variable passage section; a control valve sensitive to the pressure drop across the two throttles controls a fuel bypass flow taken from between the two throttles, to maintain said pressure drop at a constant value.

6 Claims, 7 Drawing Figures

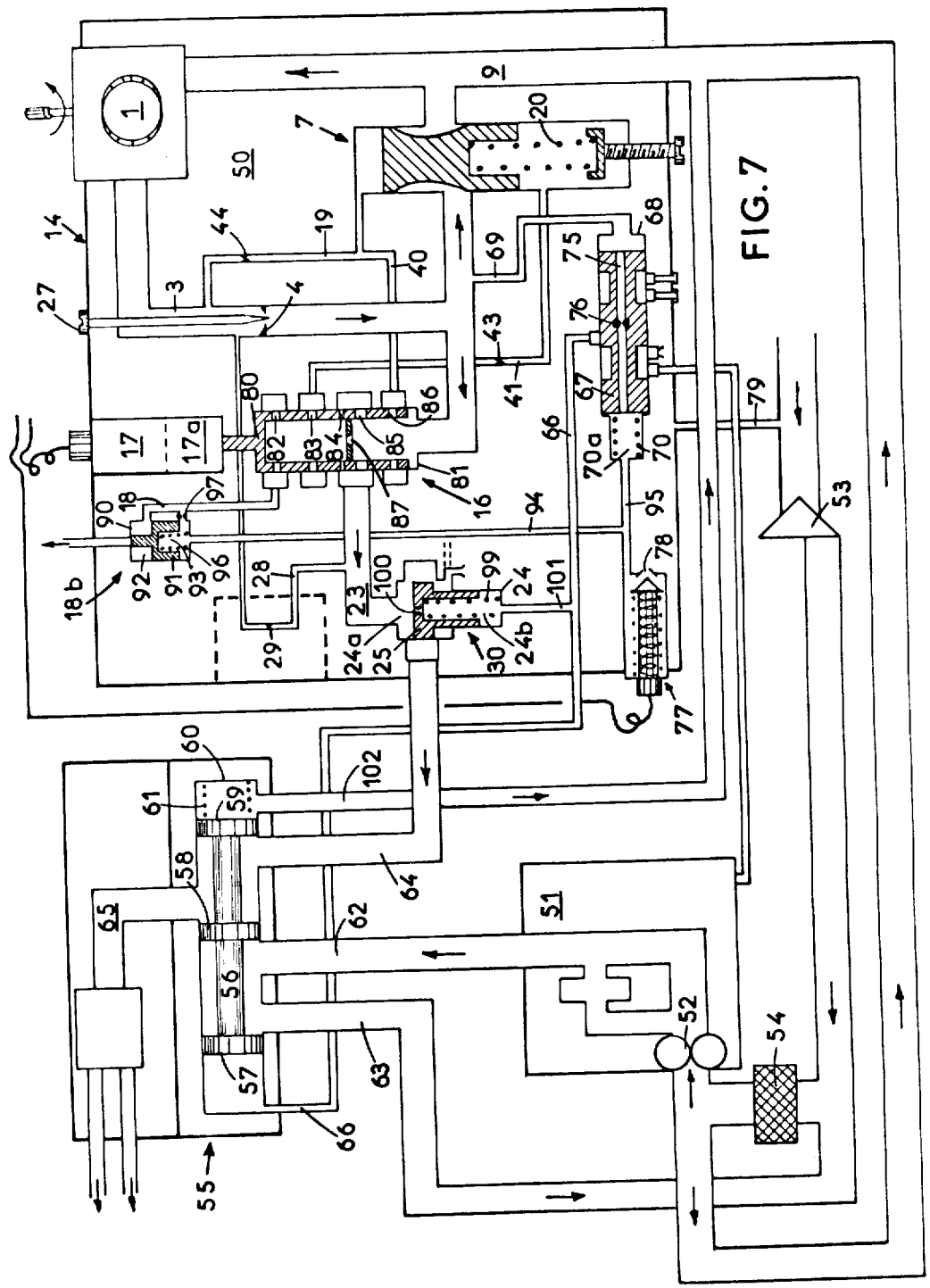

CONTROL DEVICE FOR A GAS TURBINE

BACKGROUND OF THE INVENTION

The invention concerns the control of gas turbines and involves more precisely a fuel flow rate control device, particularly for the emergency control of an aircraft turbojet engine. Gas turbines are usually controlled as a function of various operating parameters of the engine, by regulating the flow of the fuel supplied to the combustion chamber of said engine. In particular, the control mechanism of an aircraft turbojet engine is in general highly complex and thus susceptible of failure, and it is necessary to provide means to remedy such a failure, if only to enable the aircraft to reach the nearest landing ground. Various emergency devices have already been proposed; they range from the simplest, consisting of the manual control of fuel flow regulation to more elaborate control devices such as the one described in French Patent applications No. 77.29239 of Sept. 23, 1977. The simple manual fuel control device requires great skill on the part of the pilot, thus imposing an additional workload, to prevent overfeeding at high ratings. The principal disadvantages of the more elaborate emergency devices are their relative complexity and their weight.

SUMMARY OF THE INVENTION

It is the object of the present invention to provide a control device for a gas turbine which is simple and thus light, but which nevertheless insures control of fuel flow at low speeds and of speed at high ratings of the gas turbine.

For this purpose, the device according to the invention comprises a volumetric fuel pump rotated at a velocity equal or proportional to that of the engine and supplying the combustion chamber through two throttles, cascade-mounted, the downstream throttle having a controllable section of passage and the upstream throttle having a section that may be variable, and a control valve sensitive to the difference in the charging pressure of the pump upstream from the upstream throttle and the feed pressure of the chamber downstream from the downstream throttle, and regulating a fuel leakage flow between the two throttles to maintain said pressure difference at a constant value.

In one mode of embodiment, the throttle having the controllable passage cross section represents a flow rate control device controlled by the pilot by means of an electric motor and the other throttle has a constant passage cross section.

BRIEF DESCRIPTION OF THE DRAWINGS

The description which follows hereinafter in view of the drawings attached hereto, said drawings being non-limiting examples, will make the advantages of the invention very clear, together with the mode of embodiment, and it should be understood that the particulars emanating from both the drawings and the text, are part of said invention.

FIG. 7 is a diagrammatic view of a second mode of embodiment of the device of FIGS. 1 and 5, demonstrating its use as an emergency control for the fuel feed of an aircraft turbojet engine.

DESCRIPTION OF THE PREFERRED EMBODIMENTS

Figure 1:
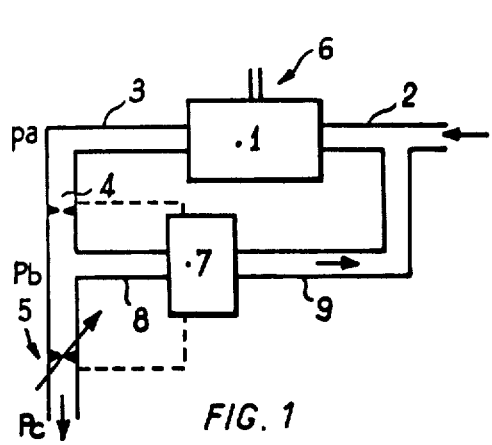
FIG. 1 is a diagrammatic illustration of the principle of a device according to the invention, said device insuring the control of the fuel supply of an aircraft turbojet engine.

FIG. 1 shows a volumetric pump 1 which receives fuel by means of a conduit 2 and recharges it into a conduit 3 containing a throttle with a fixed cross section 4 upstream from a throttle with a variable cross section 5 and terminating in the injectors, not shown, of the combustion chamber of an aircraft turbojet engine. The pump 1 is a volumetric pump and is rotated at a velocity proportional to the rotating velocity of the shaft, not shown, of the turbojet engine by a transmission 6 coupled to said shaft by means of a speed reducer, not shown. Let v be the cylinder capacity of the pump (i.e. the fuel volume moved by each turn of the rotor of the pump), N the velocity of the rotation of shaft of the turbojet engine and a the reduction ratio, then the flow of the pump $C_p$ is equal (except for leaks) to:

$$C_p = a \cdot v \cdot N \qquad (1)$$

A control valve 7, which senses the difference between the pressure $P_a$ in the conduit 3 upstream from the throttle 4, and the pressure $p_C$ downstream of the throttle 5, maintains this pressure difference at a constant value $\Delta p$ by controlling the leakage flow between a tube 8 branched on the conduit 3 between the two throttles 4, 5, and a tube 9 terminating in the suction pipe 2 of the pump.

The pressure drop in the fuel through the fixed throttle 4 is given by the Bernouilli equation:

$$P_a - P_b = \left( \frac{C_p}{k_1 s_1} \right)^2 \qquad (2)$$

where $p_b$ is the pressure downstream from the throttle 4, $s_1$ the fixed cross section of said throttle and $k_1$ a constant coefficient. Substituting the value of $C_p$ from Equation (1) in the above equation, yields $$P_a - P_b = \left( \frac{N}{k_1 s_1 / a \cdot v} \right)^2 \qquad (3)$$

The pressure drop through the variable throttle 5 is the same as given by the Bernouilli equation:

$$P_b - P_c = \left( \frac{C_m}{k_2 s_2} \right)^2 \qquad (4)$$

where $C_m$ is the fuel flow supplied to the injectors (designated the engine flow), $s_2$ the cross section of the throttle 5 (plus the cross section of a throttle 32 described hereinafter), and $k_2$ a constant coefficient. Because the control valve maintains $p_a - p_c$ at a constant value $\Delta p$, one may write:

$$(P_a - P_b) + (P_b - P_c) = \Delta p \tag{4a}$$

By replacing in this equation $(p_a - P_b)$ and $(p_b - p_c)$ by their values obtained from Equations (3) and (4), the following is obtained:

$$\left(\frac{N}{k_1 s_1/av}\right)^2 + \left(\frac{C_m}{k_2 s_2}\right)^2 = \Delta p \tag{5}$$

Figure 2:
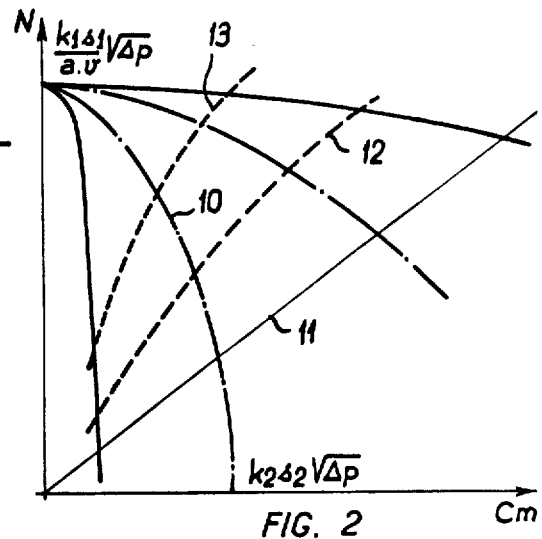
FIG. 2 is a diagram representing the characteristic curves of the regulation provided by said device, in the engine rating/fuel flow coordinate system.

This may be recognized as the equation of a family of ellipses: for every value of the parameter $s_2$, the curve representing the variations of $C_m$ as a function of N is an ellipse such as 10 FIG. 2.

By placing Equation (5) into the following form $$\left(\frac{N}{k_1 s_1 \sqrt{\Delta p/av}}\right)^2 + \left(\frac{C}{k_2 s_2 \sqrt{\Delta p}}\right)^2 = 1 \tag{5a}$$

the values of the two axes of the ellipse $(2 k_1 s_1 P)/(av)$ and $2 k_2 s_2 \Delta p$, respectively, are obtained. These ellipses are the characteristic curves of control in the field of: velocity N of the engine/fuel flow $C_m$. These characteristics are limited by the straight line 11 of the equation:

$$C_m = a \cdot V \cdot N - \epsilon \tag{6}$$

which is the running line of the fuel pump 1, being a very small constant representing leaks. The running points of the turbojet engine are given by the intersections of the elliptical curves such as 10 (each corresponding to a value of the section $s_2$ of the throttle 5) with the characteristic curves of the turbojet engine, such as 12 or 13 (corresponding to various conditions of the flight of the aircraft).

Figure 3:
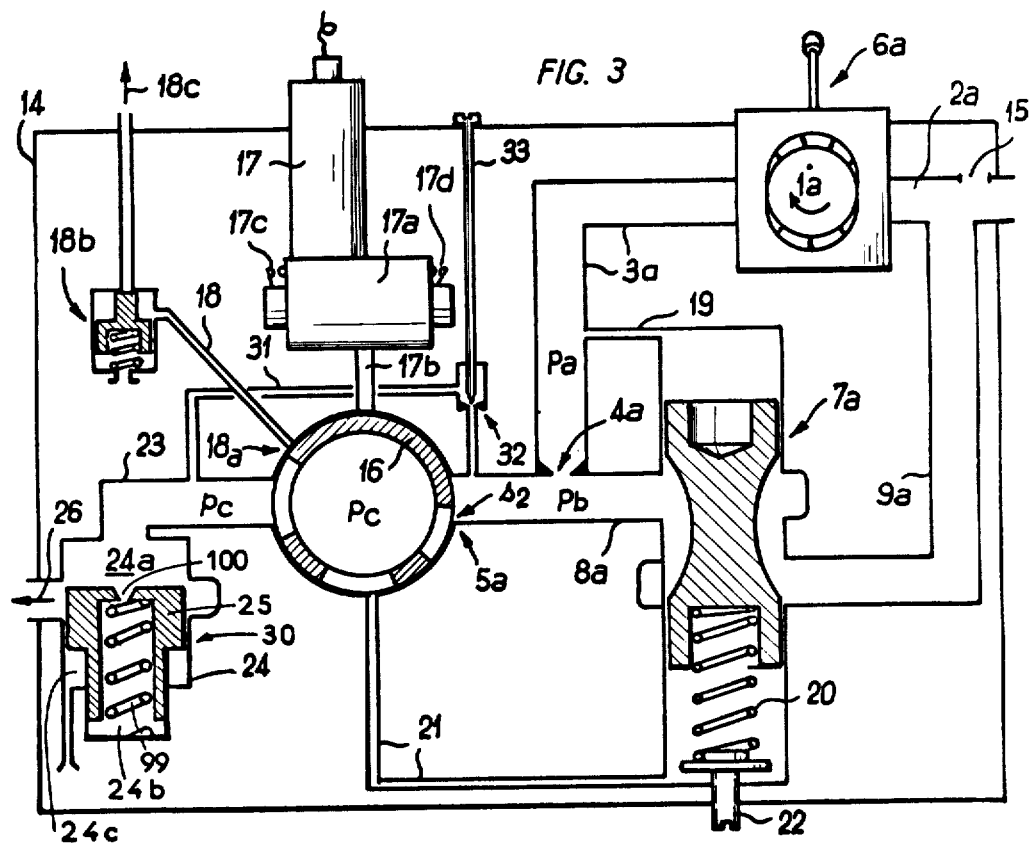
FIG. 3 diagrammatically shows a first mode of embodiment of the device of FIG. 1.
Figure 4:
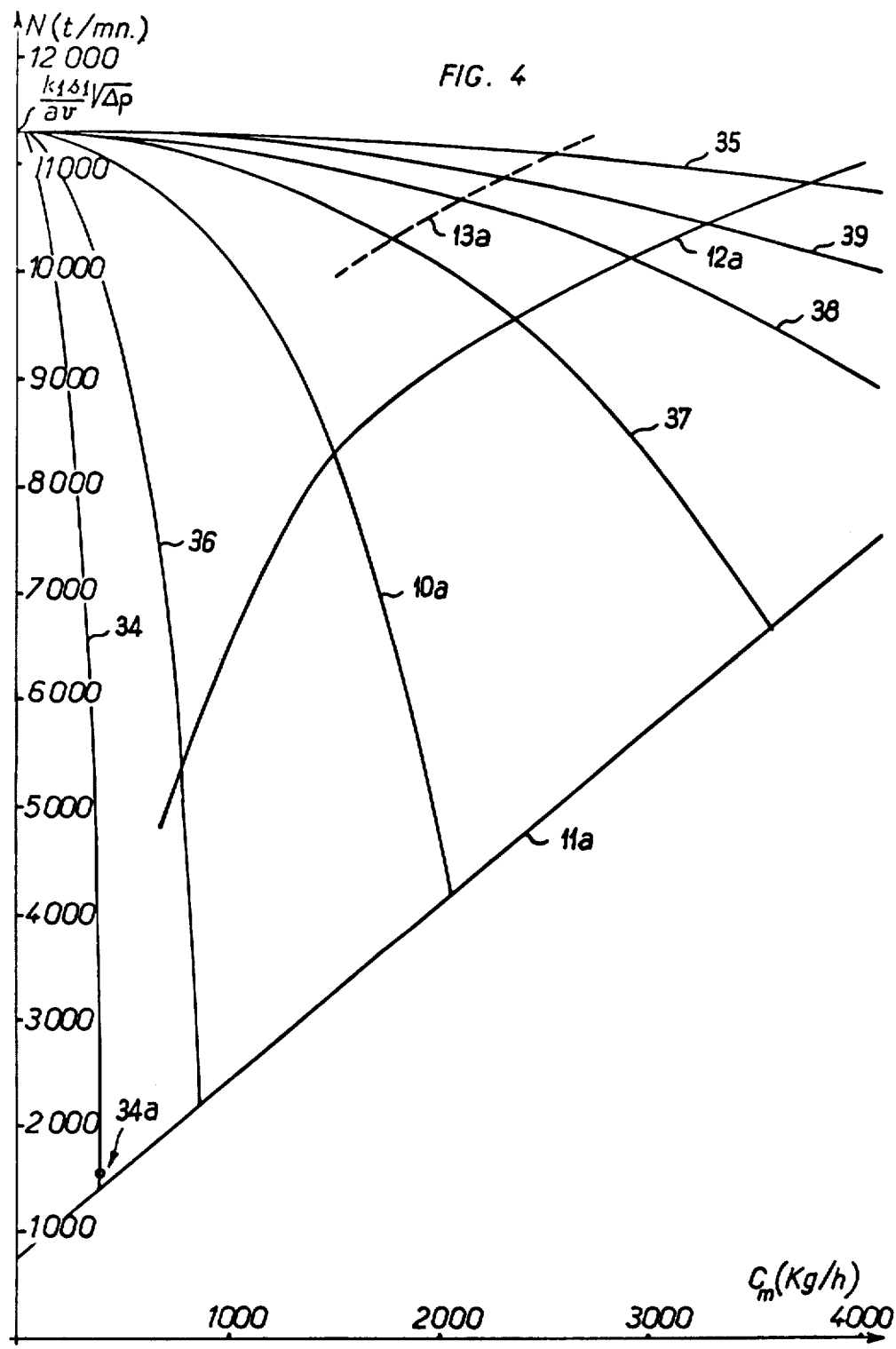
FIG. 4 is a diagram similar to FIG. 2, illustrating the functioning of the device of FIG. 3.

FIGS. 3 and 4, wherein the elements play the same role as in FIGS. 1 and 2, are provided with the same reference figures with the index a, show an embodiment in an application to emergency controls of an aircraft turbojet engine, not shown. These emergency controls are contained in a housing 14 the internal space of which is connected by means of an opening 15 with an intake line 2a. The variable throttle 5a represents a flow control device, the angular position of which is regulated by means of a transmission 17b and a reducer 17a, by an electric motor 17 actuated by means of a control handle, not shown. The reducer is equipped with two terminal switches 17c, 17d which effect respectively the stopping of the motor 17 when the valve spool 16 is in a position where it uncovers a maximum section $s_2$, and when the valve spool is in a position in which it uncovers the orifice 18a of a conduit 18, which is connected by means of a non-return valve 18b with the feed (shown schematically by an arrow 18c) of the ignition injectors in the combustion chamber of the turbojet engine (not shown). The control valve 7a comprises a cut-off slide exposed on one face to the pressure $p_a$ from the conduit 3a by means of a tube 19, and on the other face to the force of a spring 20 and the pressure $p_c$ exerted through the valve spool 16 downstream from the passage sections $s_2$, by a tube 21. A regulating screw 22 makes it possible to displace the point of support of the spring 20 to arbitrarily modify the value fo $\Delta p$.

The outlet conduit 23 of the flow control 5a terminates at a supercharger valve 30 which determines by means of the spring 99 a minimum pressure Pc allowing the feeding of the ignition circuit 18c.

Figure 5:
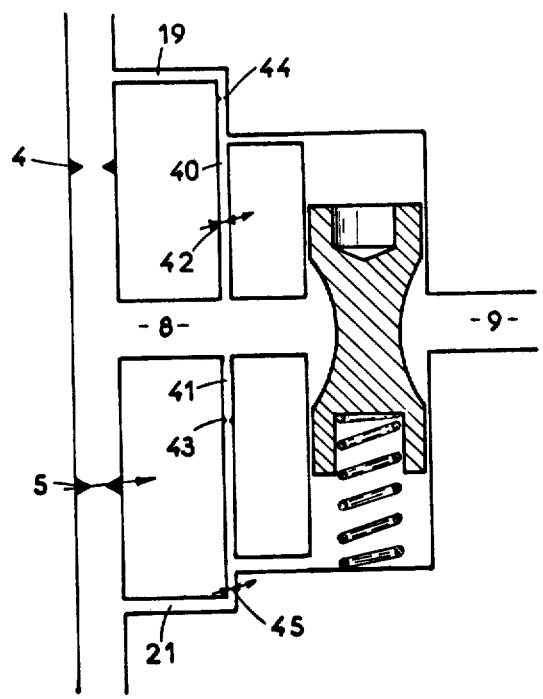
FIG. 5 is a diagrammatic view showing the principle of an improvement capable of being added to the device shown in FIG. 3.
Figure 6:
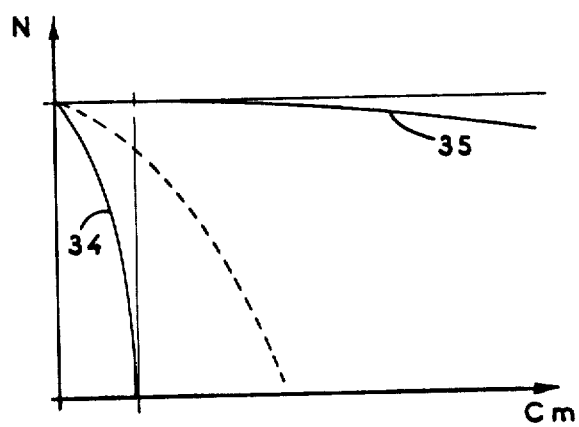
FIG. 6 is a diagram analogous to FIG. 2, demonstrating in a comparative manner the performance obtained by means of the improvement of FIG. 5.

The supercharge valve 30 consists of a slide valve 25 sliding in a housing 24, making it possible to connect as desired the conduit 23 with the conduit 26 leading to the principal injectors in the chamber of the turbojet engine. The slide valve 25 defines three chambers in the cylinder 24, i.e. two end chambers 24a and 24b, the chamber 24b including a spring 99, and an annular chamber 24c which communicates with the return (by means of the housing 14). The bottom of the slide valve 25 is pierced by an orifice 100. This orifice makes it possible, due to the fact that the pressure to be controlled in the chamber 24a is applied only to an annular and therefore reduced section, to employ a less powerful spring 99 to return the slide 25 to its closed position. The conduit 23 has a branch 31, said branch containing a throttle 32 with its cross section controlled by means of a screw 33, and providing direct communication upstream of the flow rate control with the tubing 23 to supply the principal and ignition injectors (not shown) with fuel at the rate of in flight reignition. The fuel flow rate for reignition is controlled by regulating the screw 33. It is seen in FIG. 4 that all of the elliptical characteristics, such as 10a terminate perpendicularly at the axis of the N at the same point of the ordinate $$N_{max} = \frac{k_1 s_1}{av} \sqrt{\Delta p}$$

so that when the emergency control is operating, the rotational velocity of the turbojet engine at a stabilized speed cannot exceed the value of $N_{max}$. Said value $N_{max}$ is determined by the value of $\Delta p$, which may be controlled by means of the screw 22. In order to pass from one elliptical characteristic to another, the section $S_2$ of the throttle 5a is modified by acting on the valve spool 16 by means of the handle, not shown, which actuates the electric motor 17. When $s_2$ attains its minimum value (the minimum value of $s_2$ is defined by the variable throttle cross section 32: the throttle 5a is then completely closed, (this condition being illustrated as an example by the characteristic 34, FIG. 4), the system controls the flow rate: N being low, $p_a - p_b$ is negligible compared to $p_b - p_c$, so that the control valve 7a practically assures the control of $p_b - p_c$, so that the control valve 7a practically assures the control of $p_b - p_c$, and thus of $C_m$ (see Equation (4) hereinabove); this is the case specifically of the reignition at a constant flow rate of the turbojet engine in flight, at the point 34a of the characteristic 34. When $s_2$ attains its maximum value (illustrated as an example by the characteristic 35), the system controls speed: $p_b - p_c$ is then negligible compared to $P_a - p_b$, so that the valve 7a in practice assures control of $p_a - p_b$, and thus of N (see Equation (3) hereinabove); this is the case of full gas operation in continuous flight. For intermediate values of $s_2$ (the characteristics 36, 10a, 37, 38, 39) the transition between the two types of regulations described hereinabove is continuous. It is thus seen that in addition to its simplicity of embodiment, the emergency control described presents the advantages of insuring, by means of the control valve 7a, the regulation of the rate of fuel flow for reignition in flight, and the control of the velocity N of the turbojet engine during full gas operation with protection against overfeeds. The emergency control further renders it possible to change in a continuous manner from the reignition speed to full gas speed by providing convenient controls and good pivotability of the turbojet engine at all speeds. According to the fundamental diagram of FIG. 5, an added improvement may further facilitate the regulatory function in this respect of the device in the two extreme configurations, i.e. pure fuel flow rate control and pure speed control. The diagram of FIG. 6 shows that one obtains, due to the improvement, characteristic curves of regulation which approach straight lines, parallel respectively to ordinate and the abcissa axis. According to this improvement, there are provided, on the tubes 19 and 21 respectively, a first branch 40 and a second branch 41 terminating at the tube 8, where the pressure existing between the throttles 4 and 5 prevails. The first branch 40 includes a variable throttle 42 and the second branch 41 includes a throttle 43. Further, on the tube 19 a throttle 44 is provided, upstream from the branching off of the first branch, and on the tube 21 there is provided a variable throttle 45 downstream from the branching off of the second branch. Due to this improvement, the following are eliminated:

during reignition, the effects of the loss of pressure across the variable throttle 4 (which thus becomes less and less negligible when N increases);

at full gas, the effects of the loss of pressure across the variable throttle 5 (the cross section of which thus cannot be considered infinite). In actual fact then, the control device according to the invention, improved as shown in FIG. 5, operates in the following manner.

During reignition, the variable throttles 42 and 45 are largely open and have cross sections which are much greater then those of the constant throttles 44 and 43. The control valve then regulates the bypass flow so that the flow is constant through the throttle 5. A control characteristic which conforms to the curve 34 of FIG. 6 is obtained, which approaches a vertical straight line, approximately, as the valve spring tightens. At full gas, the variable throttles 42 and 45 are closed and the control valve thus operates by maintaining a constant Δp across the stationary throttle 4; the latter is thus traversed by a flow proportional to the speed. The characteristic curve of this configuration is the characteristic 35 shown in FIG. 6, which approaches a horizontal straight line at the rate of the tightening of the valve spring. Between these two extreme positions, the characteristic control curves are analogous to those shown in the diagram of FIG. 4.

FIG. 7 illustrates an embodiment for the emergency control of an aircraft turbojet engine. In this figure, the elements have the same roles as in the preceding figures and are designated by the same reference numerals. The new elements which appear in the figure are intended for connection with and modification of the action of the principal controls. An emergency control device 50 and a principal control device 51 are supplied respectively by a volumetric pump 1 and a pump 52, both moving fuel through a feed pump 53 and a principal filter 54. A commutator 55 insures the transfer of functions between the principal controls and the emergency control device. The commutator is shown in the form of a slide 56 with three shoulders 58, 57, 59, moving in translation in a housing 60 under the action of on the one hand of the pressure of the fluid carried by the conduit 66-101 and supplied by the supercharger valve 30, and on the other hand, of an opposing spring 61 supported by an end wall of the housing 60, the pressure of said spring being added to the pressure of fluid carried by the conduit 102 and exerted by the emergency fuel when not in use. In the position shown, the spring 61 being compressed, the commutator insures the activation of the emergency control, the shoulders 57 and 58 being positioned so that the outlet conduit 62 of the control 51 is placed in communication with the return 53, and the shoulder 59 being positioned so that the outlet conduit 64 of the control 50 is in communication with the feed line 65 of the injectors.

It may be readily understood that in the position (not shown) corresponding to the operation of the principal controls, the commutator insures the communication of the conduit 62 with the conduit 65, and of the conduit 64 with the conduit 102, branched off the return tube 9. In this configuration, not shown, a relatively low pressure suffices to add its effect to that of the spring 61.

The displacement of the commutator 55 is assured by means of a control slide 67 with three shoulders, moving in translation in a housing 68 under the influence, on the one hand, of the pressure of a fluid carried by the conduit 69, and on the other hand, of an opposing spring 70, supported by the opposite end wall of the housing 68. The action of said spring 70 is added to that of the pressure of the fluid carried by a conduit 95 inside a cavity 70a which contains the spring 70. An axial conduit 75 extending through the slide 67 is equipped with a restriction 76. In this manner, the displacement of the slide 67 may be initiated—for the emergency setting—by the actuation of an electro valve 77 which places into communication the outlet orifice 78 of said electro valve, by means of the conduit 79, with the upstream side of the feed pump 53, thus dropping the pressure inside the cavity 70a, so that the cross section of the outlet opening 78 is much larger than that of the restriction 76. In the position shown, the conduit 66 terminating at the slide 67 is cut off, so that the pressure acting on the slide 56 comes exclusively from the supercharger valve 30 through the conduit 101, due to the particular design of the supercharger valve 30 of FIG. 7, described in more detail hereinafter. In the position (not shown) of the operation of the principal controls, the slide 67 insures the return of the pressure originating in the supercharger valve 30, by causing the pressure to drop in the conduit 66. In the housing enclosing the different units of the emergency control, the other units named in the description of FIG. 3 will also be seen: a volumetric pump 1 rotated at a velocity equal or proportional to that of the turbine engine, a control valve 7 sensitive to the difference between the pressure upstream of a stationary throttle 4 (carried by tube 19) and a pressure downstream from a variable throttle 85 channeled by a passage 83-87. The variable throttle 85 and the passage 83-87 belong to a measuring valve spool 16 controlled by the pilot by means of an electric motor 17 and a reducer 17a. The outlet conduit 23 of the valve spool supplies the principal injectors by means of the supercharger valve 30, which differs from its homolog in FIG. 3 by an additional logic action to be detailed further hereinafter. The ignition valve 18b is placed in the conduit 18 which connects the valve spool 16 with the fuel line of the ignition injectors. An adjusting screw 27 will be noted at the level of the stationary upstream section 4. This screw makes it possible to assign to the section 4 a suitable value of flow rate during full throttle operation. A branch 28 issuing from the conduit 23 contains a restriction 29 hereinafter designated the mixture control.

Let us now examine the details of the particular structure of this embodiment, specifically concerning the fuel meter 16, the ignition valve 18b, the supercharger valve 30 and the mixture control 29. The fuel meter 16 incorporates in a single element the three variable cross section 5, 42 and 45, respectively, of the improvement according to FIG. 5. This element consists of a valve spool 80 rotating in a housing 81 under the action of an electric motor 17. This valve spool comprises the openings 82, 83, 84, 85 and 86. A partition having orifice 87 is integral with the valve spool and defines inside the said valve spool two intercommunicating chambers. The communicating opening 82 constitutes a port moving in front of the outlet of the conduit 18 terminating at the valve 18b. The communicating orifice 83, which is always open, forms with the partition and orifice 87, the passage 21 of FIG. 5. The communicating orifice 84 constitutes a port moving in front of the fixed orifices of a cover (not shown) connected with the housing, at the outlet of the conduit 23, forming the variable cross section 45 of FIG. 5. The communicating orifice 85 constitutes a port corresponding to the cross section of the variable passage 5 of FIG. 5. The communicating orifice 86 constitutes a port moving in front of the outlet of a branch 40 branched off the tube 19, forming the variable cross section 42 of FIG. 5. The valve 18b comprises a cylinder 90 in which a slide 91 slides, making it possible to connect the conduit 18 with the ignition injectors through an end chamber 92. The opposite slide 91 defines in the cylinder 90 an end chamber 93 which communicates by means of a conduit 94 with the conduit 95 connecting the electro-valve 77 with the emergency slide 67. This chamber 93, which encloses the spring 96 of the valve 18b, communicates, when the slide 91 is in the position to close the valve, with the tube 18 by means of a small orifice 97. In this manner, the random leaks of the valve spool 16, in periods without ignition, are directed toward the return by the conduit 94. In normal operation, the slide is maintained in equilibrium by the pressures prevailing in the conduits 94, 95, to which are applied the force of the spring, on the one hand, and the pressure of the fluid carried by the conduit 18, on the other hand. During emergency operation, the fluid pressure in the conduits 94, 95 drops. In this case, either the communicating orifice 82 of the valve spool 80 is open to control ignition and the pressure carried by the conduit 18 will open the valve, while simultaneously closing the small diaphragm 97, or, the communicating orifice 82 of the valve spool 80 is closed and the slide 91 remains closed under the action of the spring which is no longer exposed to the opposing fluid pressure. The supercharger valve 30 also comprises a modification with respect to the configuration of FIG. 3. In FIG. 7, the bottom of the cylinder 24, on the side of the chamber 24b communicates, by means of the conduit 101 with the conduit 66. The control pressure carried by the conduit 66-101 assures passage during normal operation.

An optional improvement, consisting of the mixture control 29, is also shown in FIG. 7. In FIGS. 5 and 6, an improvement was seen, which during ignition or at low speeds allows the modification of the slope of the curve 34. A conduit 28, providing a direct communication between the conduits 3 and 23, and carrying a restriction 29, again affords an improvement of the slope of said curve, for the ignition or slow speed configuration. In FIG. 7, the restriction 29 has been represented as being fixed. It could also be made variable as a function of a parameter such as the output pressure of the compressor.

It should be obvious that the embodiments described are given only as examples and that they may be modified, in particular by the substitution of technical equivalents, without departing from the scope of the invention. In particular, the upstream throttle 4 or 4a of FIG. 3, may have a variable passage section, for example, in response to the variation of an operating parameter of the turbojet engine, or to adjust the value of the speed of the jet engine at full throttle, if the force of the spring 20 cannot be controlled. Similarly, the supercharger valve of FIG. 7 may play the role of a stop valve insuring, without the use of a commutator, the conversion to the operation of the principal controls.

I claim:

1. A control device for a gas turbine, for use particularly as an emergency control for a turbojet engine, comprising, a fuel pump having a delivery circuit provided with means to create a pressure drop as a function of the rotating velocity of the turbojet engine, a throttle with a variable passage section mounted in series with said means, and a control valve sensitive to the sum of the pressure drop across said means and to the pressure drop across said variable section and controlling a fuel bypass form between said means and said variable cross section to maintain constant the said sum of pressure drops.

2. A control device for a gas turbine according to claim 1, wherein said fuel pump is a volumetric fuel pump rotated at a velocity equal or proportional to that of the turbojet engine, in which said means consists of a throttle designated as the upstream throttle, said upstream throttle being adjustable to provide a variable passage cross section.

3. A control device according to claims 1 or 2, in which the throttle having a variable passage cross section, designated as the downstream throttle, is a flow measuring device controlled by the pilot and the upstream throttle has a fixed passage cross section.

4. A control device according to one of claims 1 or 2, in which the control valve comprises selectively operable means for modification at will of the value at which said sum of the pressure drop is maintained.

5. A control device according to claim 2, characterized in that in the passages leading to the control valve, the feed pressure of the pump taken upstream of the upstream throttle and the feed pressure of the chamber taken downstream of the downstream throttle, a first branch and a second branch are placed, said branches opening between the two said throttles, each of the said branches containing a throttle, the throttle of the first branch being variable, each of said passages containing, respectively, between the point of the taking of the feed pressure of the pump and the branching off of the first branch, and, between the point of the taking of the pressure downstream from the downstream throttle and the branching off of the second branch, a throttle, with the throttle corresponding to the second diversion being variable.

6. A control device according to claim 5, characterized in that the downstream throttle, the throttle of the first branch and the throttle corresponding to the second branch consist of variable port sections in a measuring valve spool.

* * * * *